US008515784B2

(12) United States Patent
Russell

(10) Patent No.: US 8,515,784 B2
(45) Date of Patent: Aug. 20, 2013

(54) SYSTEMS AND METHODS OF PROCESSING HEALTH CARE CLAIMS OVER A NETWORK

(75) Inventor: Rita S. Russell, Atlanta, GA (US)

(73) Assignee: McKesson Financial Holdings, Hamilton (BM)

( * ) Notice: Subject to any disclaimer, the term of this patent is extended or adjusted under 35 U.S.C. 154(b) by 1170 days.

(21) Appl. No.: 11/843,899

(22) Filed: Aug. 23, 2007

(65) Prior Publication Data

US 2009/0055225 A1 Feb. 26, 2009

(51) Int. Cl.
*G06Q 40/00* (2012.01)

(52) U.S. Cl.
USPC ........................................ 705/4; 705/2; 705/3

(58) Field of Classification Search
USPC ............. 705/2, 4, 39, 34; 701/117; 235/379, 235/375
See application file for complete search history.

(56) References Cited

U.S. PATENT DOCUMENTS

| | | | |
|---|---|---|---|
| 4,667,292 A * | 5/1987 | Mohlenbrock et al. | ........... 705/2 |
| 4,916,611 A | 4/1990 | Doyle, Jr. et al. | |
| 5,235,507 A | 8/1993 | Sackler et al. | |
| 6,341,265 B1 | 1/2002 | Provost et al. | |
| 7,174,302 B2 | 2/2007 | Patricelli et al. | |
| 7,380,707 B1 * | 6/2008 | Fredman | ........................ 235/379 |
| 2002/0156651 A1 * | 10/2002 | Florio et al. | ........................ 705/2 |
| 2003/0195769 A1 | 10/2003 | Francis | |
| 2003/0200118 A1 | 10/2003 | Lee et al. | |
| 2004/0064386 A1 | 4/2004 | Goguen et al. | |
| 2004/0073456 A1 * | 4/2004 | Gottlieb et al. | .................... 705/2 |
| 2004/0073465 A1 | 4/2004 | Wilson | |
| 2004/0103062 A1 | 5/2004 | Wood et al. | |
| 2004/0148203 A1 | 7/2004 | Whitaker et al. | |
| 2004/0172313 A1 | 9/2004 | Stein et al. | |
| 2005/0010446 A1 | 1/2005 | Lash et al. | |
| 2005/0015280 A1 | 1/2005 | Gabel et al. | |
| 2005/0033604 A1 | 2/2005 | Hogan | |
| 2005/0091080 A1 | 4/2005 | Biats, Jr. | |
| 2005/0108067 A1 | 5/2005 | Chapman et al. | |
| 2005/0187800 A1 | 8/2005 | Luftig | |
| 2005/0251428 A1 | 11/2005 | Dust et al. | |
| 2005/0267784 A1 | 12/2005 | Slen et al. | |
| 2005/0288964 A1 | 12/2005 | Lutzen et al. | |
| 2006/0010007 A1 | 1/2006 | Denman et al. | |
| 2006/0020495 A1 | 1/2006 | Baker et al. | |
| 2006/0064320 A1 | 3/2006 | Postrel | |
| 2006/0080144 A1 | 4/2006 | Goel et al. | |
| 2006/0085231 A1 | 4/2006 | Brofman | |
| 2006/0095303 A1 | 5/2006 | Baldwin et al. | |
| 2006/0149784 A1 | 7/2006 | Tholl et al. | |
| 2008/0103826 A1 * | 5/2008 | Barrett | .............................. 705/2 |
| 2008/0228641 A1 * | 9/2008 | Fredman | ........................ 705/39 |

\* cited by examiner

*Primary Examiner* — Behrang Badii

(74) *Attorney, Agent, or Firm* — Alston & Bird LLP

(57) ABSTRACT

Various embodiments of the present invention provide systems and methods for automatically substantiating claims for health care reimbursement account plans, such as a self-funded flexible spending account (FSA), an employer-funded health care savings account (HSA), or a health care reimbursement account (HRA) over a non banking network. In particular, in various embodiments, a claims processing system is configured for receiving a claim for a health care related expense over a non-banking communications network from a health care provider and processing the claim to determine if the health care reimbursement plan account is eligible, if the balance of the account is greater than or equal to the amount of payment requested, and if the claim is sufficiently substantiated.

36 Claims, 8 Drawing Sheets

SYSTEMS AND METHODS OF PROCESSING HEALTH CARE CLAIMS OVER A NETWORK

BACKGROUND OF THE INVENTION

Customers purchasing health care related goods or services may be covered by a primary insurance plan and by health care reimbursement plans, such as self-funded flexible spending accounts (FSA), health care spending accounts (HSA), or health care reimbursement accounts (HRA). The health care reimbursement plans may cover expenses not otherwise covered by the primary insurance plan, such as costs for co-payments, prescription drugs, and some over-the-counter medications and health care products.

Under some health care reimbursement plans, the patient pays out of pocket for the health care related purchase, and the patient or his/her employer submits a claim to the health care reimbursement plan administrator requesting reimbursement for the purchase. These reimbursement claims require the patient to provide sufficient information to the health care reimbursement plan administrator to allow the health care reimbursement plan administrator to verify that the purchase qualifies as a valid purchase under the health care reimbursement plan, which is generally referred to as substantiating the claim.

In an effort to improve upon this process, other health care reimbursement plans and/or the patient's employer have issued payment cards (e.g., debit or credit cards) to the patient that are linked to the patient's health care reimbursement plan account and are usable by the patient to pay for health care related expenses. However, this arrangement may have disadvantages, such as difficulty in providing substantiation information for the payment due to the limited number of data fields available over the banking networks used by credit and debit cards which may result in the need for the patient or patient's employer to submit substantiation documentation after the purchase, high costs associated with setting up a system that accepts these types of cards (e.g., new point-of-sale devices or software to communicate over the banking networks), and high fees payable by the health care provider for using the banking networks.

Providing documentation to the administrator may require patients or health care providers to physically mail the documentation to the plan administrator. Thus, significant delays may result before patients receive reimbursement, which may dissuade patients from participating in the health care reimbursement plan.

Thus, a need in the art exists for an arrangement that allows payment for eligible purchases at the point of sale from the health care reimbursement plan and provides sufficient substantiating documentation to health care reimbursement plan administrators to avoid unduly burdening customers or their employers.

BRIEF SUMMARY OF THE INVENTION

Various embodiments of the invention provide a claims processing system for processing health care reimbursement plan claims. The system is configured to: (1) electronically receive from a health care provider, via a communications network, a health care reimbursement claim, (2) verify that the claim is sufficiently substantiated, (3) generate an approval response message in response to verifying that the claim is sufficiently substantiated, and (4) generate a denial response message in response to the claim not being sufficiently substantiated. The communications network includes one or more non-banking networks, and in one embodiment, the claims processing system is remotely located from the health care provider.

According to various embodiments, the claim requests that at least a portion of a cost for a health care-related service or product provided by the health care provider be paid from a health care reimbursement plan account, such as a flexible spending account (FSA), a health care savings account (HSA), or a health care reimbursement account (HRA). In addition, the claim, according to one embodiment, includes a customer identifier, a health care reimbursement plan account identifier associated with the health care reimbursement plan account, an amount requested to be paid by the health care reimbursement plan account, a health care-related service or product identifier, an health care provider identifier associated with the health care provider, and a date the service or product is provided.

BRIEF DESCRIPTION OF THE DRAWINGS

Figure 1A:
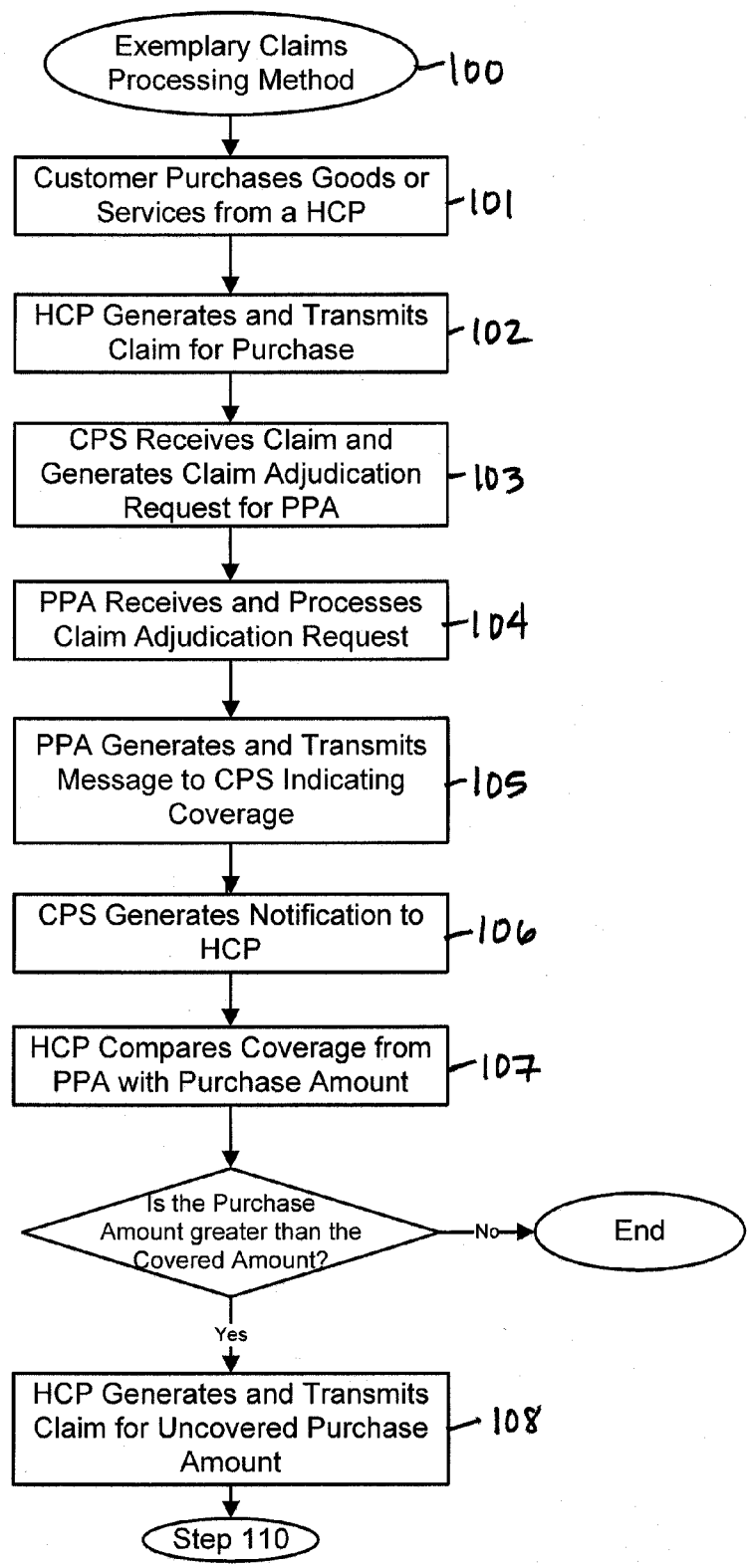
Figure 1B:
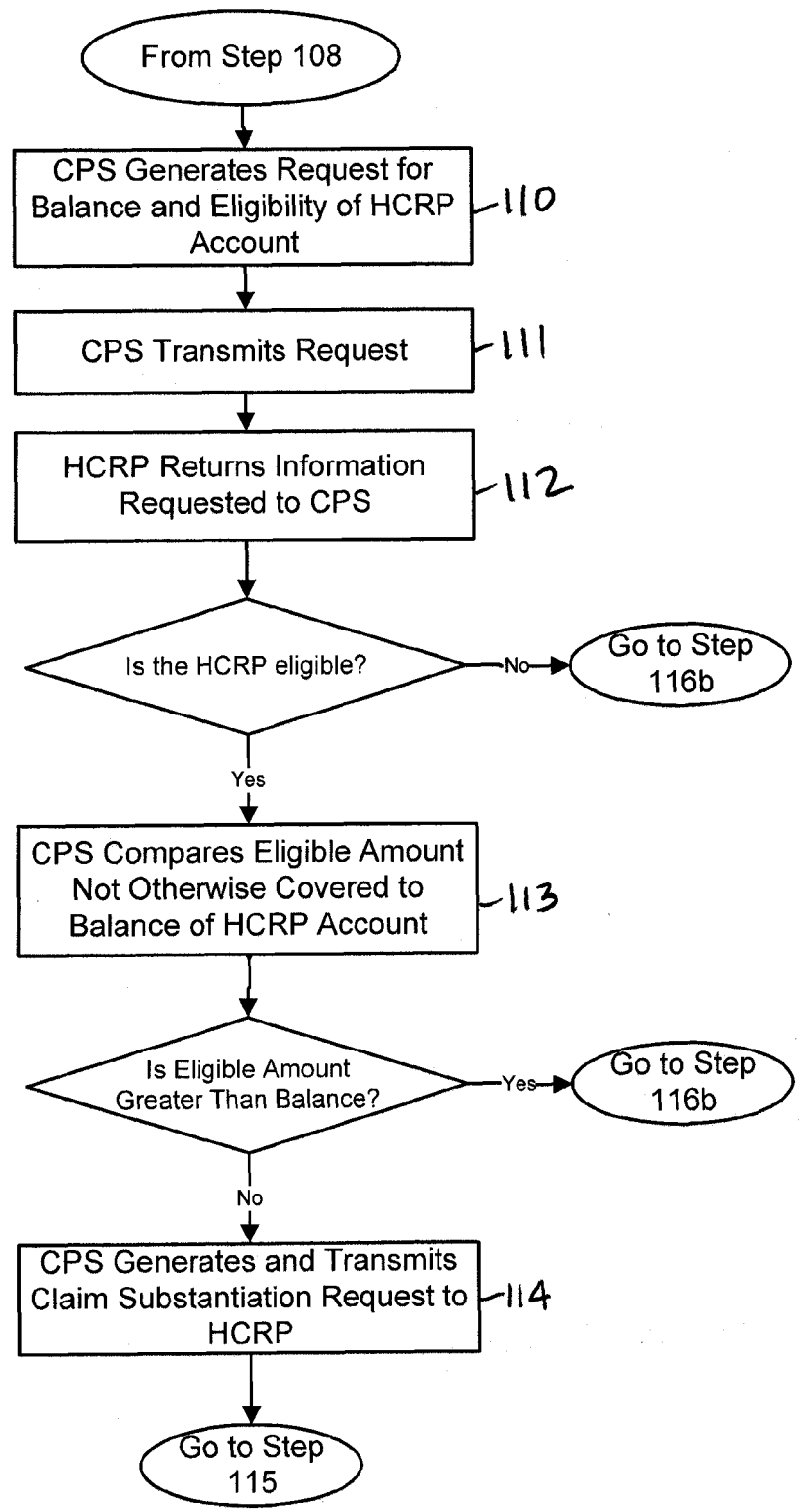
Figure 1C:
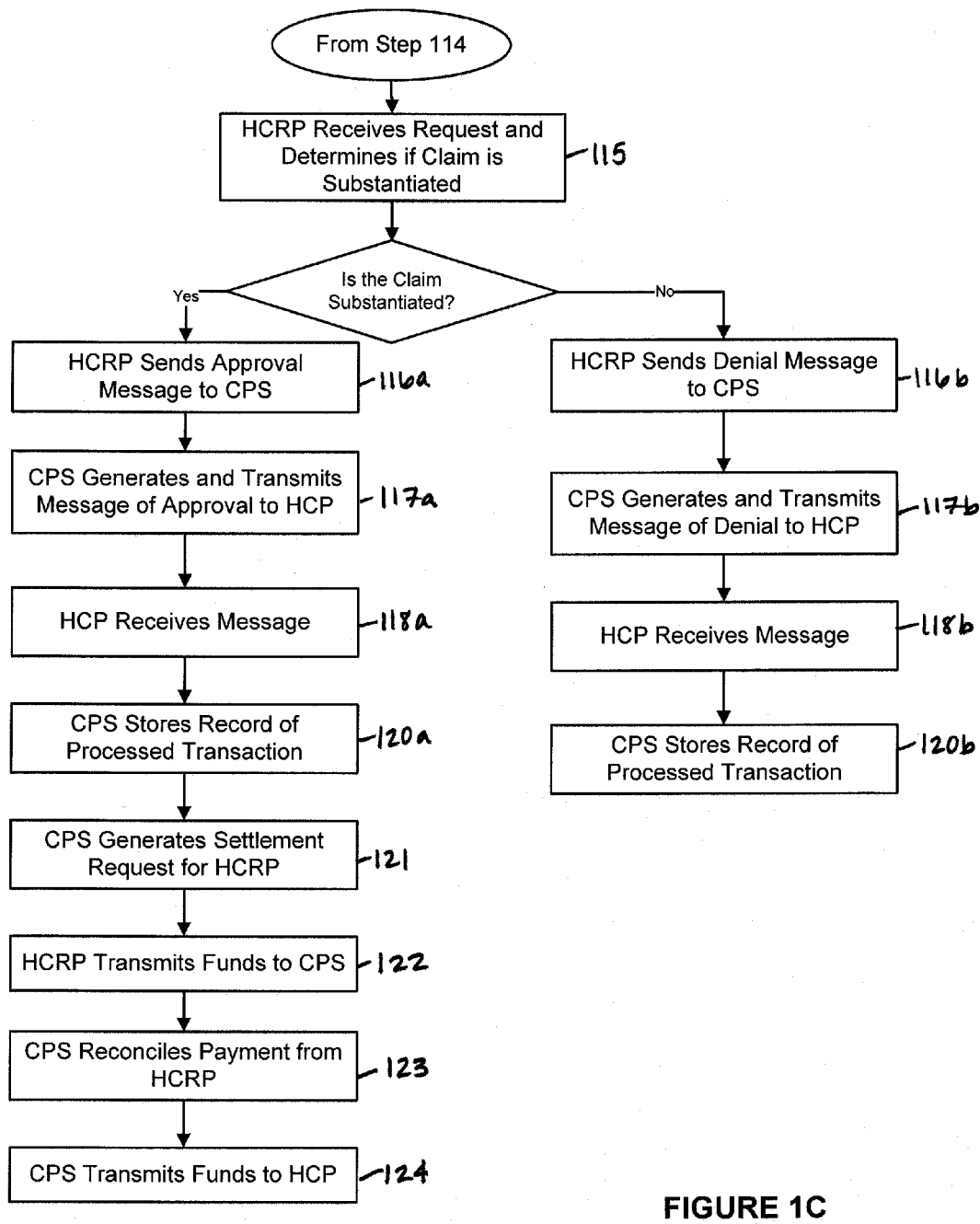

Having thus described the invention in general terms, reference will now be made to the accompanying drawings, which are not necessarily drawn to scale, and wherein:

FIGS. 1A-1C are schematic diagrams illustrating a claims processing method according to one embodiment of the invention.

Figure 2:
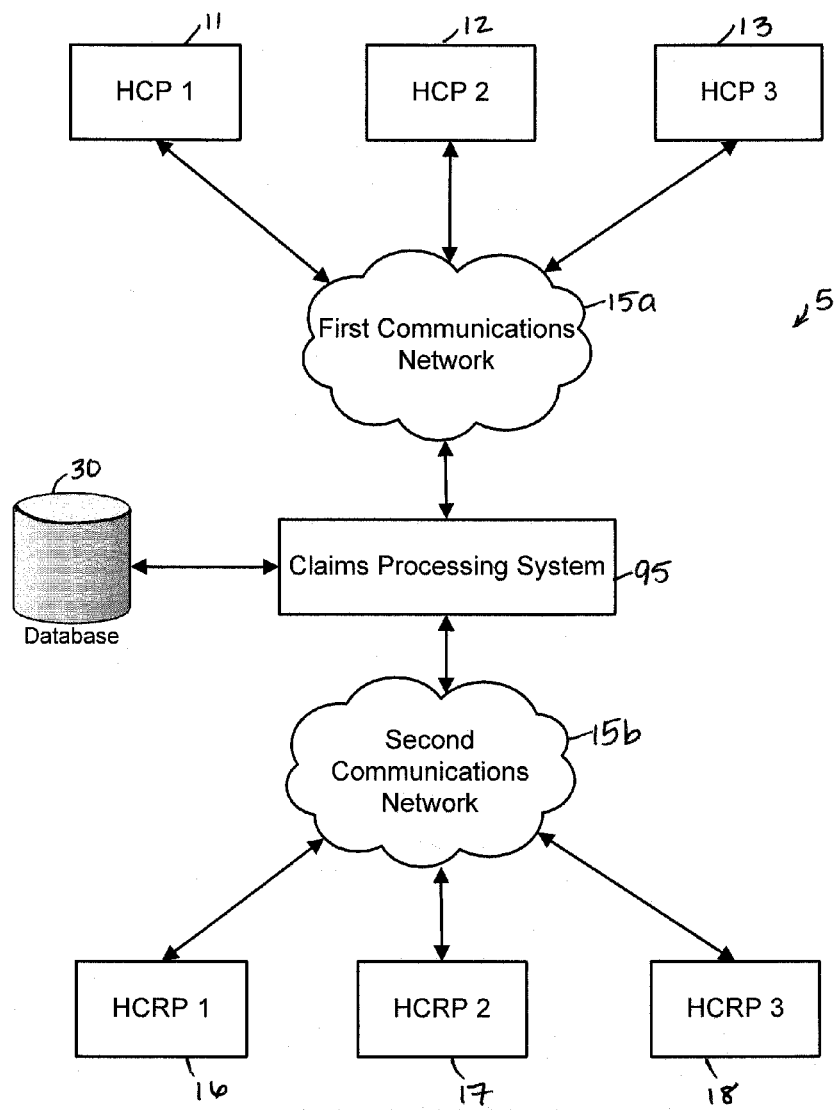

FIG. 2 is a flowchart illustrating a claims processing system according to one embodiment of the invention.

Figure 3:
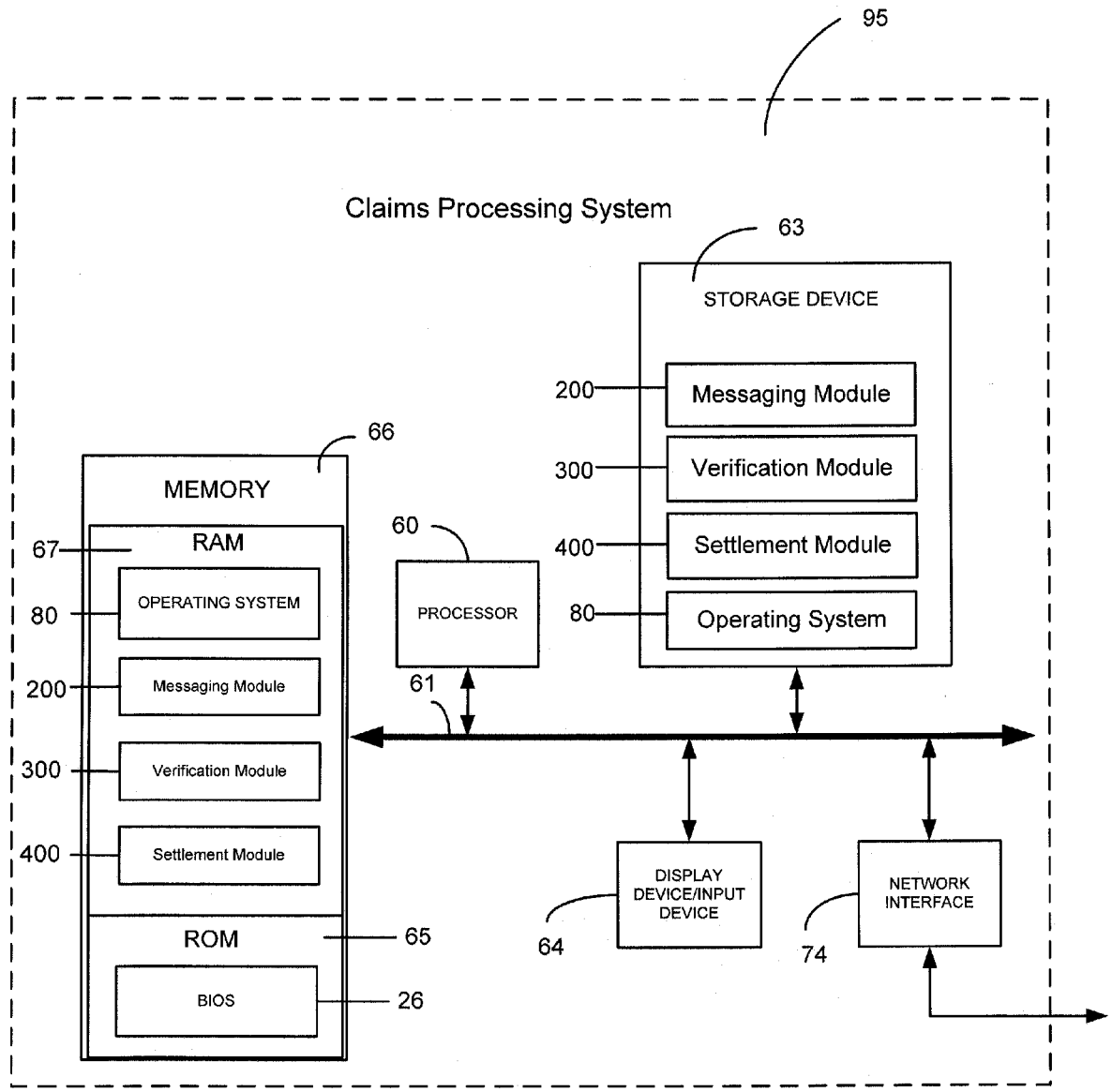

FIG. 3 is a schematic diagram illustrating a claims processing server according to one embodiment of the invention.

Figure 4:
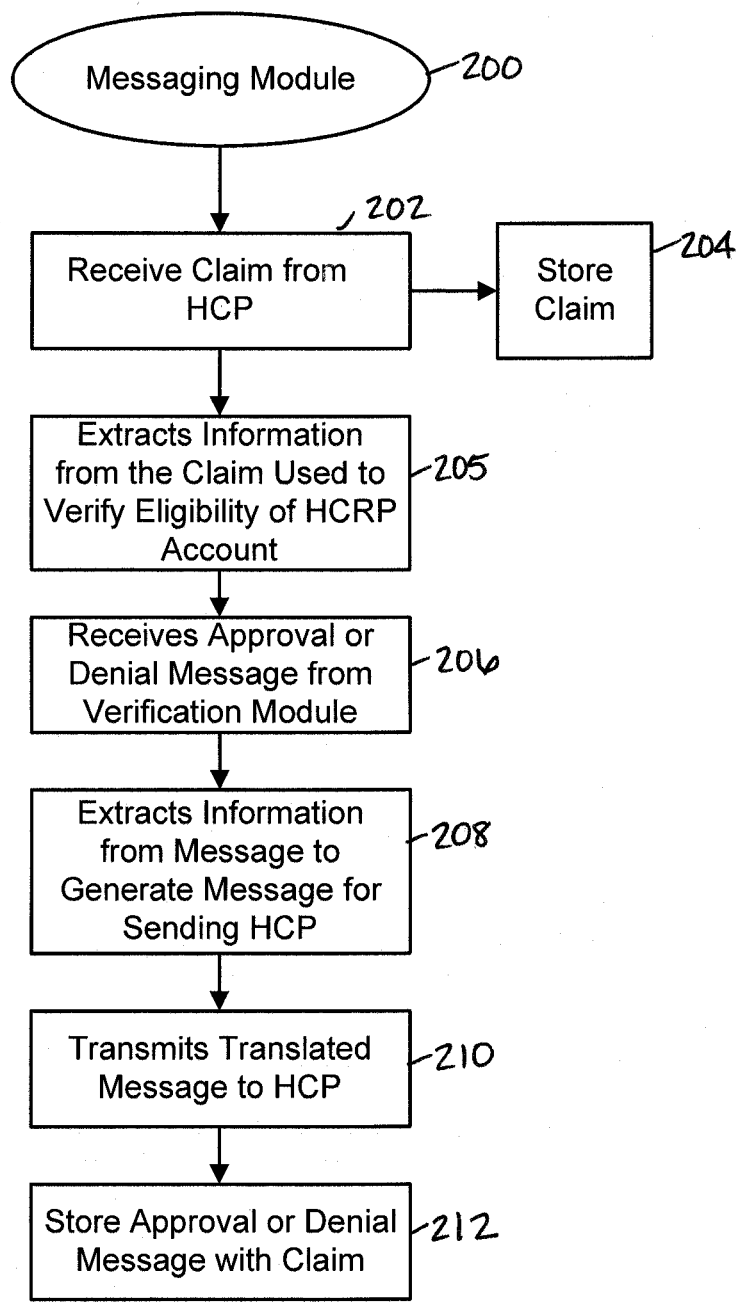

FIG. 4 is a flow diagram of a messaging module according to one embodiment of the invention.

Figure 5:
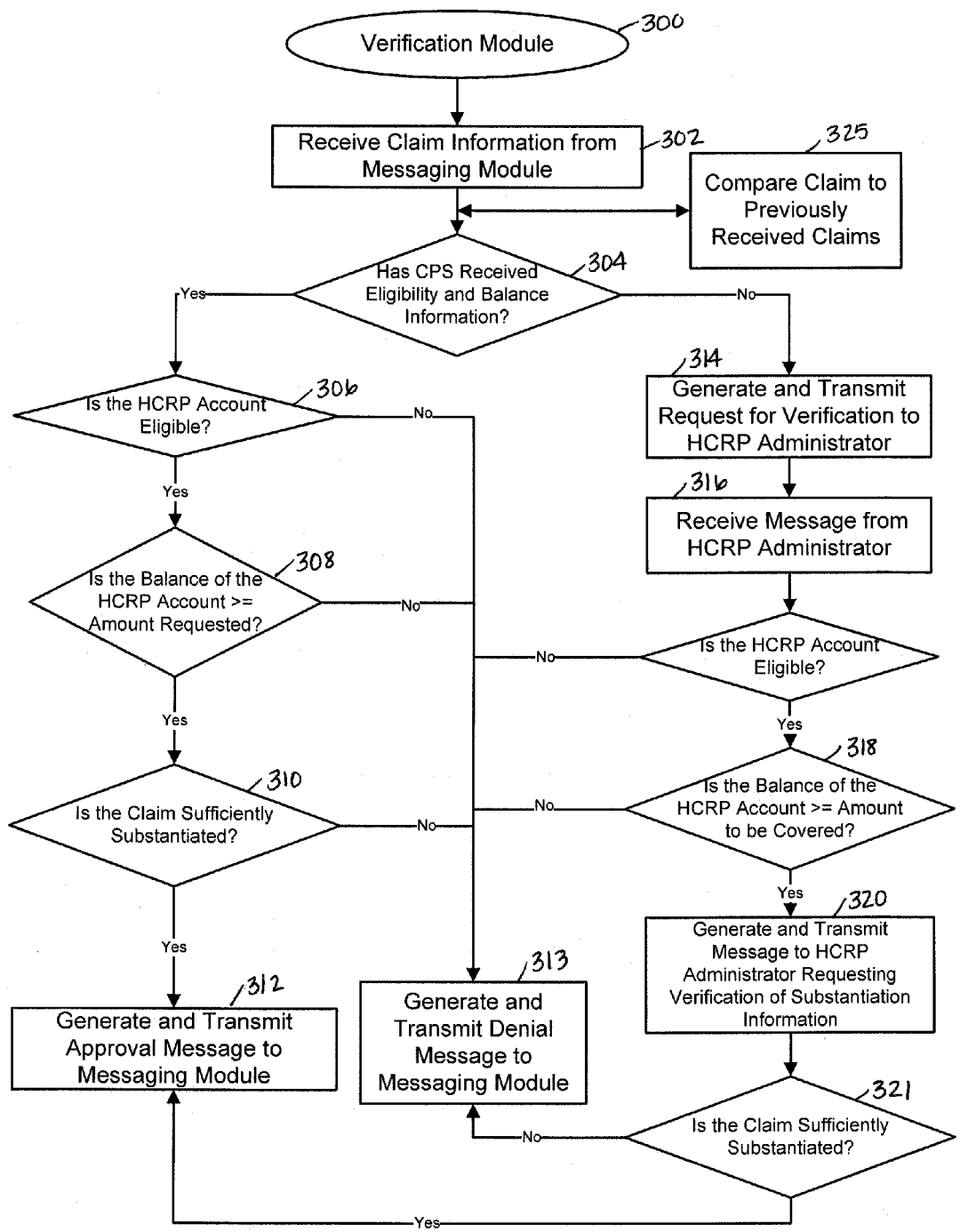

FIG. 5 is a flow diagram of a verification module according to one embodiment of the invention.

Figure 6:
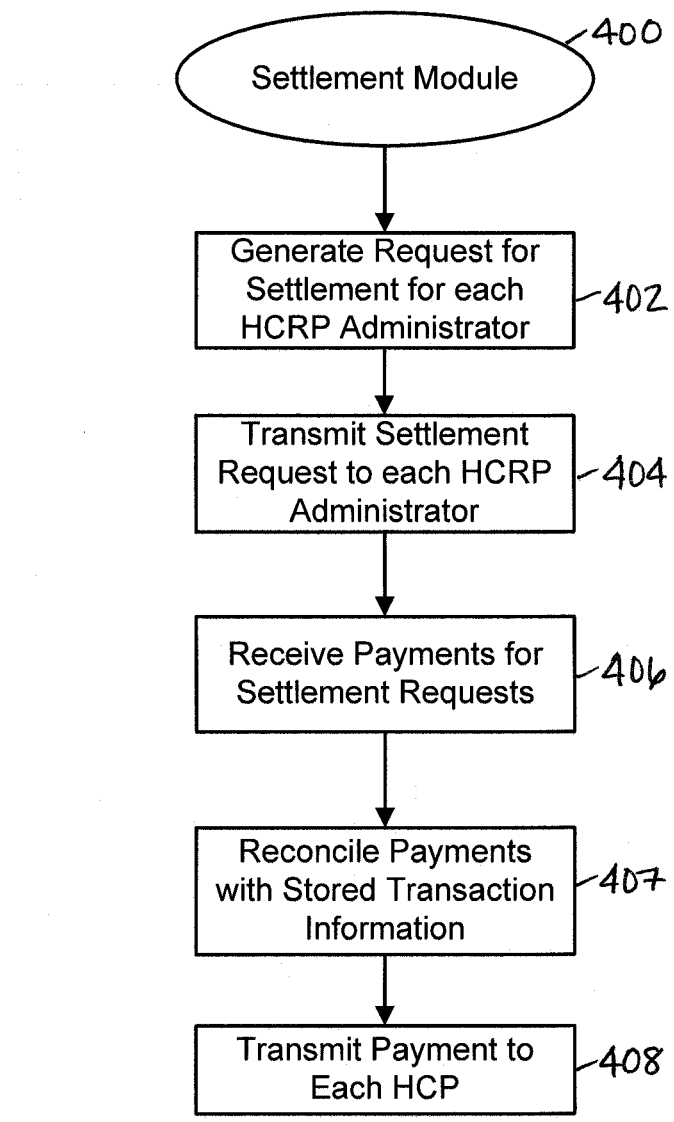

FIG. 6 is a flow diagram of a settlement module according to one embodiment of the invention.

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Brief Overview

Various embodiments of the present invention provide systems and methods for communicating and automatically substantiating claims for health care reimbursement plans, such as FSA, HSA, or HRA plans. In various embodiments, the auto-substantiation process occurs in substantially real time over a non-banking network, which eliminates fees the health care provider would otherwise have to pay to process debit or credit card transactions, reduces the amount of paper work customers (or their employers) have to provide to health care reimbursement plan (HCRP) administrators to substantiate claims, reduces administrative costs for the employers and the HCRP administrators, and prevents merchants from having to install and implement merchant-based inventory information approval systems (IIAS).

In particular, as shown in FIGS. 1A-1C, an exemplary claims processing method 100 according to various embodiments of the invention begins with a customer purchasing goods or services from a health care provider (HCP), such as a pharmacy or a doctor, shown in Step 101. According to various embodiments, the customer may present a primary insurance plan card and a HCRP card, such as an FSA, HSA, or HRA card, to the health care provider. The HCRP card includes information about a health care reimbursement account, such as an FSA, HSA, or HRA, that is used by the customer to pay for at least a portion of the costs of health care goods or services being purchased that are not covered by a primary insurance plan. Alternatively, the information contained on the HCRP card may be loaded onto, or otherwise associated with, the primary insurance plan card or another customer card to eliminate the need for separate cards. The HCRP and primary insurance plan cards may be magnetic strip cards, RFID tokens, smart cards, or any other of numerous well-known devices capable of identifying the customer or their respective primary insurance or HCRP plans.

Using the information provided by the primary insurance plan card and the HCRP card, the health care provider generates and electronically transmits a claim for payment of at least a portion of the purchased goods and services to a claims processing system, shown as Step 102. In a particular embodiment, the claim includes a purchase amount and/or an amount of coverage requested for at least a portion of the purchase, a description of the goods or services to be covered under the plans, an identification of a primary health care plan and a health care reimbursement plan requested to pay for at least a portion of the amount of coverage requested, an identity of the health care provider submitting the claim, the date of purchase, and/or the identification of the customer requesting payment for the purchase. The information included in the claim may vary to accommodate the information requirements of a particular system. According to various embodiments, the claim is electronically transmitted to the claims processing system via a first communications network, such as, for example, the Internet or other public, non-banking network or a private network, such as the network provided by RelayHealth of Atlanta, Ga.

Next, the claims processing system receives the claim and uses at least a portion of the information in the claim to generate a claim adjudication request for the primary insurance plan administrator (PPA), shown as Step 103. The claim adjudication request is transmitted electronically to the PPA via a second communications network. According to various embodiments, the second communications network may be the Internet or other public, non-banking network or a private network, such as the network provided by RelayHealth of Atlanta, Ga. In addition, in a particular embodiment, the first network and the second network are the same network, and in another embodiment, the first network and the second network are different networks or different subparts of the same network.

The PPA receives the claim adjudication request and processes it to determine if at least a portion of the goods or services to be purchased are covered under the primary insurance plan, which is shown as Step 104. If at least a portion of the goods or services to be purchased are covered under the primary insurance plan, the PPA generates and electronically transmits a message to the claims processing system indicating the portion covered by the plan, shown as Step 105. This message, according to various embodiments, may be transmitted over the second communications network.

Upon receiving the message from the PPA, the claims processing system generates a notification for the health care provider that relays the message from the PPA indicating whether the purchase of the goods or services is covered under the primary insurance plan, which is shown as Step 106. This notification, according to various embodiments, may be transmitted electronically over the first communications network.

In Step 107, the health care provider compares the amount of coverage to be provided by the primary insurance plan with the amount of the purchase. In one embodiment, if the amount of coverage provided by the primary insurance plan is less than the amount of the purchase, the health care provider generates and electronically transmits a claim for payment for the uncovered purchase amount, shown as Step 108. The claims processing system receives the claim for the uncovered purchase amount and generates a request for the balance and/or eligibility status of the HCRP account that is requested by the customer to be used to cover the uncovered purchase amount, which is shown in Step 110, and transmits the request electronically to the HCRP administrator over the second communications network in Step 111. The HCRP administrator returns information to the claims processing system indicating whether the HCRP account is eligible and its associated balance, shown in Step 112, via the second communications network. In an alternative embodiment (not shown), the HCRP administrator provides the claims processing system with a listing of eligible accounts and their associated balances periodically (e.g., daily, every two days, weekly, etc.), and the claims processing system accesses this listing to determine the balance and eligibility of the HCRP account. In yet another embodiment, the claims processing system generates and transmits a request to the HCRP administrator to authorize the amount to be covered by the HCRP account in lieu of receiving balance information from the HCRP administrator.

In Step 113, if the HCRP account is eligible, the claims processing system determines the amount of the balance of the purchase to be made (portion of the purchase amount not covered by the primary insurance plan) that is eligible for payment from the HCRP account and compares this amount to the balance in the HCRP account. If the eligible amount is less than the balance in the HCRP account, the claims processing system generates and transmits a request to the HCRP administrator to verify that the claim is sufficiently substantiated over the second communications network, which is shown in Step 114. The HCRP administrator receives the request and determines if the claim is substantiated under the HCRP, which is shown in Step 115. If the claim is payable, the HCRP administrator sends an approval message to the claims processing system over the second communications network, which is shown in Step 116a. If the claim is not payable, the HCRP administrator sends a denial message to the claims processing system over the second communications network, which is shown in Step 116b. In an alternative embodiment, the claims processing system compares the information in the claim from the health care provider to substantiation parameters provided by the HCRP administrator and adjudicates the claim on behalf of the HCRP administrator.

If the claim is substantiated and an approval message is sent in Step 116a, the claims processing system then generates an approval message for sending to the health care provider over the first communications network to inform the health care provider and the customer the portion of the purchase payable under the HCRP, which is shown in Step 117a. An approval message in one embodiment may include the amount covered by the HCRP and the balance of the HCRP account after the purchase is made. If the claim is not substantiated, if the HCRP account is not eligible, or if the eligible amount of the claim is greater than the balance of the HCRP account, the claims processing system generates and transmits a denial message to the health care provider, which is shown as Step 117b.

Upon receiving the approval or denial message from the claims processing system, which is shown as Steps 118a and 118b, the health care provider can display or otherwise communicate the approval or denial message to the customer and request additional payment methods, if necessary.

In addition, according to various embodiments, the claims processing system stores records of each claim transaction it processes for reconciliation, settlement, and/or auditing purposes, as shown in Steps 120a, 120b. For example, as shown in Step 121, the claims processing system periodically generates and transmits a settlement request to each HCRP administrator requesting payment for claims processed and approved during a certain time period (e.g., daily, every 72 hours). In response to receiving the settlement request, as shown in Step 122, the HCRP administrator transmits the funds requested to the claims processing system (e.g., via ACH or EFT) and, in one embodiment, a detailed payment file (e.g., via FTP) itemizing claims for which the payment covers. Next, in Step 123, the claims processing system reconciles the payment from the HCRP administrator and the detailed payment file with the claims stored by the claims processing system. Then, in Step 124, the claims processing system transmits payment to each of the health care providers for which claims were processed. In a particular embodiment, the claims processing system further generates a standard 835 remittance file, which is a standard file set by ANSI and used in the health care industry, for each health care provider and transmits this file with the payment.

In various embodiments, the claims processing system may be remotely located from the health care provider. In addition, according to various embodiments, the claims processing system may be independent of the health care provider, the PPA, and the HCRP administrator. For example, in a particular embodiment, the claims processing system may be associated with a health care-related network provider, such as RelayHealth of Atlanta, Ga.

According to various embodiments, this process allows customers to have claims for HCRP accounts processed in substantially real-time and prevents the customers from having to submit additional substantiation information to the HCRP administrator after purchasing health care goods or services. Thus, customers may avoid having to make out of pocket expenditures for purchases of health care goods or services and prepare the paperwork previously required to obtain reimbursement for these out of pocket health care expenses. In addition, according to various embodiments, health care providers can eliminate credit or debit card fees that are charged to process payments over the banking network, eliminate requests for paperwork for substantiating purchases, and reduce overall costs associated with processing HCRP claims. Furthermore, according to various embodiments, employers that offer HCRP accounts to their employees are able to offer these accounts while avoiding the overhead costs typically associated therewith and the risk of giving employees debit cards to use to access HCRP accounts and eliminating paper substantiation for purchases and reduce administrative costs.

System Architecture

A system 5 according to one embodiment of the invention is shown in FIG. 2. As may be understood from this figure, in this embodiment, the system includes one or more health care provider computers 11, 12, 13 and one or more HCRP administrator computers 16, 17, 18 that are connected via one or more networks 15a, 15b (e.g., a LAN, the Internet, and/or private network) to communicate with a claims processing system 95. In one embodiment of the invention, the claims processing system 95 is configured for retrieving data from, and storing data to, a database 30 that may be stored on (or, alternatively, stored remotely from) the claims processing system 95. In an alternative embodiment, the system 5 may include more than one database 30. In other embodiments, the claims processing system 95 may be one or more computers or software programs running on one or more computers.

FIG. 3 shows a schematic diagram of a claims processing system 95 according to one embodiment of the invention. The claims processing system 95 includes a processor 60 that communicates with other elements within the claims processing system 95 via a system interface or bus 61. Also included in the system 95 is a display device/input device 64 for receiving and displaying data. This display device/input device 64 may be, for example, a keyboard or pointing device that is used in combination with a monitor. The system 95 further includes memory 66, which preferably includes both read only memory (ROM) 65 and random access memory (RAM) 67. The system's ROM 65 is used to store a basic input/output system 26 (BIOS), containing the basic routines that help to transfer information between elements within the system 95. Alternatively, the claims processing system 95 can operate on one computer or on multiple computers that are networked together.

In addition, the system 95 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. For example, as shown in FIG. 3, program modules of the claims processing system 95 may include an operating system 80, a messaging module 200, a verification module 300, and a settlement module 400. The messaging module 200, verification module 300, and settlement module 400 may be used to control certain aspects of the operation of the claims processing system 95, as is described in more detail below, with the assistance of the processor 60 and an operating system 80.

Also located within the system 95 is a network interface 74, for interfacing and communicating with other elements of a computer network. It will be appreciated by one of ordinary skill in the art that one or more of the system's 95 components may be located geographically remotely from other system 95 components. Furthermore, one or more of the components may be combined, and additional components performing functions described herein may be included in the system 5.

Exemplary System Operation

As mentioned above, the system 5 according to various embodiments enables transmission of claims for payment of health care related goods and services from health care reimbursement plans (HCRP) and real-time, or near real-time, adjudication of the claims over a non-banking network. In particular, in various embodiments, the claims processing system 95 includes a messaging module 200, a verification module 300, and a settlement module 400. The messaging module 200 may be configured to communicate claim information between one or more health care providers 11, 12, 13 and the claims processing system 95. In addition, the messaging module 200 may be configured to extract claim information received from the health care providers 11, 12, 13 and translate it into information that is usable by the HCRP administrators 16, 17, 18 to adjudicate claims, and vice versa. The verification module 300 may be configured to determine if the claims are made to eligible HCRP accounts and if the amount requested in each claim is less than or equal to the balance of the account. In a particular embodiment, the verification module 300 also compares information received against substantiation business rules provided by the HCRP administrators 16, 17, 18 to determine if the claim is sufficiently substantiated. Finally, the settlement module 400 may be configured to generate settlement requests for each HCRP administrator 16, 17, 18, reconcile payments received from each HCRP administrator 16, 17, 18, and transmit payments to each health care provider 11, 12, 13. Each of these modules is discussed in more detail below.

Messaging Module

FIG. 4 illustrates a flow diagram of a messaging module 200 according to various embodiments of the invention. Beginning at Step 202, the messaging module 200 receives a claim from a health care provider 11, 12, 13 over a first communications network 15*a*, and in Step 204, the claim is stored on the claims processing system 95. According to various embodiments, the claim may include information from the health care provider 11, 12, 13 such as, for example, the type of transaction (e.g., a prescription billing or reversal, a health care service billing or reversal, or a health care product billing or reversal), the identity of the health care provider 11, 12, 13, the date of transaction, identity of the patient, identity of the primary cardholder, identity of the group or plan to which the account belongs, identity of the HCRP (e.g., "BIN" of the HCRP as that term is used in the health care industry), personal information about the patient (e.g., date of birth, gender, name, address, and/or phone number), product or service identifier, a coverage code, amount of total costs paid (or payable) by another payor (e.g., primary insurance plan and/or secondary insurance plan), total amount of service or goods purchased, and/or the amount requested to be paid by the HCRP (e.g., which may also include a breakdown of the costs, such as sales tax percentage, amount paid by the patient, and/or the usual and customer charge).

According to one embodiment, the claim is received electronically (e.g., via email, XML, facsimile, text message (e.g., short message service ("SMS"), telephone, kiosk, or point of sale device at a seller location) over the first communications network 15*a*, which may include, for example, a private network, the Internet, or other public, non-banking network. In a particular embodiment, the claim is received via a private network used to transmit claims for primary insurance plans from health care providers, such as the network provided by RelayHealth of Atlanta, Ga.

As shown in Step 205, in response to receiving the claim, the messaging module 200 extracts information from the claim that is used to verify the eligibility of the HCRP account, such as, for example, an identification number associated with the HCRP account and/or the identification of the customer, and transmits this information to the verification module 300. In one embodiment, the information extracted is in the form of an alpha and/or numeric code, and the messaging module 200 translates the extracted information into text or other format understandable by the HCRP administrator 16, 17, 18. For example, in one embodiment, the messaging module 200 extracts a code representing the identity of the health care provider 11, 12, 13 and translates the code into the name and address of the health care provider 11, 12, 13 for sending to the HCRP administrator 16, 17, 18. In another example, according to one embodiment, the messaging module 200 extracts a NDC number representing a prescribed drug and translates the number into the name of the drug. In various alternative embodiments, Step 205 may be performed prior to or simultaneously with Step 204. Furthermore, in a particular embodiment in which the second communications network 15*b* is the Internet and the first communications network 15*a* is a non-banking network other than the Internet, the messaging module 200 translates information from the claim received from the health care provider 11, 12, 13 into HTML or XML language to allow for transmission of the information over the Internet to the HCRP administrator 16, 17, 18.

After the claim is further processed by the verification module 300, which is discussed below in relation to FIG. 5, the messaging module 200 receives an approval or denial message regarding the claim from the verification module 300, shown in Step 206. The messaging module 200 then extracts certain information from this approval or denial message to generate an approval or denial message for sending to the health care provider 11, 12, 13 that submitted the claim, shown as Step 208. The information extracted in Step 208 may include, according to various embodiments, information indicating whether the claim has been approved or denied, the amount approved or denied, the balance of the HCRP account after the purchase, and/or the date of purchase. In one embodiment, the information extracted is in the form of an alpha and/or numeric code or a statement, and the messaging module 200 translates the extracted information into a format understandable by the HCP and customer. For example, in one embodiment, the messaging module 200 translates the extracted information into a message to the health care provider 11, 12, 13 that states or indicates "Approved" or "Denied", and provides the dollar amount approved or denied after the claim is processed. The messaging module 200 may also provide the balance of the account with the amount approved or denied, according to one embodiment. In a further embodiment, if the claim is denied, the message to the health care provider 11, 12, 13 may also include a reason why the claim is denied, such as, for example, "Ineligible Account", "Insufficient Funds in Account", or "Insufficient Substantiating Information." According to various other embodiments, the denial message may include a code indicating denial of the claim or text indicating denial of the claim.

According to various embodiments, the messaging module 200 then transmits the translated approval or denial response message to the health care provider 11, 12, 13 over the first communications network 15a, shown as Step 210, and in Step 212, the messaging module 200 stores the approval or denial message (e.g., message from the HCRP administrator or the message sent to the health care provider) with the claim information stored in Step 204 in the claims processing system 95. In various alternative embodiments, Step 212 may be performed prior to or simultaneously with Step 210.

Verification Module

FIG. 5 illustrates a flow diagram of a verification module 300 according to various embodiments of the invention. Beginning at Step 302, the verification module 300 receives from the messaging module 200 information extracted from the claim that is used to verify the eligibility of the account, such as, for example, an identification number (or code) associated with the HCRP account (e.g., HCRP's BIN and/or the customer's plan and/or group number). Then, in Step 304, the verification module 300 determines whether the claims processing system 95 has received eligibility and balance information for the HCRP account from the HCRP administrator 16, 17, 18 or whether a request for verification needs to be generated and transmitted to the HCRP administrator 16, 17, 18. If the claims processing system 95 has received eligibility and balance information for the HCRP account from the HCRP administrator 16, 17, 18, the verification module 300 compares the identifier associated with the HCRP account with the eligibility information received from the HCRP administrator 16, 17, 18 to determine if the HCRP account is active and if the customer is linked to the account, which is shown in Step 306. If the HCRP account is eligible and the customer is linked to the account, then the verification module 300 compares the balance of the HCRP account with the amount requested in the claim, which is shown in Step 308. If the customer is paying a co-pay amount, this amount may be compared to acceptable co-pay amounts (or multiples thereof) provided by the HCRP administrator, according to one embodiment. If the balance of the HCRP account is greater than or equal to the amount requested, the verification module 300 verifies that the information provided in the claim includes information sufficient to substantiate the claim, which is shown in Step 310. In one embodiment, for example, the information required to substantiate the claim includes the name of the person receiving the goods or services, the type or description of goods or services being purchased, the name and address of the health care provider 11, 12, 13, the amount charged, and the date the service was provided. In various embodiments, the HCRP administrator 16, 17, 18 may provide business rules to the claims processing system 95 that indicate the type of information required to substantiate claims. According to one embodiment, a list of eligible accounts, the balances of those accounts, and the type of information (and/or business rules) for substantiating claims for each HCRP administrator may be provided to the claims processing system via a batch file or FTP, for example, on a periodic basis (e.g., daily, every two days, etc.).

If the account is eligible, the customer is linked to the account, the claim is sufficiently substantiated, and the balance in the HCRP account is greater than or equal to the amount requested in the claim, the verification module 300 generates an approval response message and transmits the approval response message to the messaging module 200 for transmitting to the health care provider 11, 12, 13, which is shown in Step 312. However, if the account is determined to be ineligible in Step 306, if the account balance is less than the amount requested in the claim in Step 308, or if the claim is not sufficiently substantiated in Step 310, the verification module generates a denial response message and transmits the denial response message to the messaging module 200 for transmitting to the health care provider 11, 12, 13, which is shown as Step 313. In a particular embodiment, the response messages include a transaction code (e.g., indicating whether the response message is an approval response, a reversal response, or a denial response), a date of service, plan identifier, health care provider identifier, and/or an amount paid and the account balance.

Returning to Step 304, if the verification module 300 has not received eligibility and balance information from the HCRP administrator or the information is potentially out-of-date, the verification module 300 generates and transmits a request for verification to the HCRP administrator 16, 17, 18, which is shown as Step 314. According to various embodiments of the invention, the verification request is generated in a format that allows it to be electronically transmitted (e.g., via email, XML, facsimile, text message (e.g., short message service ("SMS"), telephone, kiosk, or point of sale device at a seller location) over the second communications network 15b to the appropriate HCRP administrator 16, 17, 18. The second communications network 15b, according to a particular embodiment, is the Internet. In addition, in various embodiments, the verification request may be formatted according to preferences provided by the HCRP administrator 16, 17, 18, and according to other embodiments, the verification request is formatted similarly for all (or most) HCRP administrators 16, 17, 18.

The HCRP administrator 16, 17, 18 receives the request for verification and returns a message to the claims processing system 95 indicating the account balance and whether the HCRP account is eligible and the customer is linked with the account over the second communications network 15b. In Step 316, the verification module 300 receives the message from the HCRP administrator 16, 17, 18 and, if the HCRP account and the customer are indicated as eligible in the message, compares the amount requested in the claim to the balance returned by the HCRP administrator 16, 17, 18, which is shown as Step 318. In an alternative embodiment, the verification module 300 may request the HCRP administrator 16, 17, 18 to verify that the amount to be covered in the claim is less than or equal to the balance of the account. If the balance of the HCRP account is greater than or equal to the amount to be covered, the verification module 300 then generates and transmits a second message to the HCRP administrator 16, 17, 18 requesting the HCRP administrator 16, 17, 18 to verify that the information provided in the claim is sufficient to substantiate the claim, which is shown as Step 320.

A response from the HCRP administrator 16, 17, 18 is received by the verification module 300 in Step 321. In response to receiving a response from the HCRP administrator 16, 17, 18 indicating that the claim is sufficiently substantiated, the verification module 300 provides an approval response message to the messaging module 200, which is shown as Step 312. However, if the HCRP account is indicated as ineligible in Step 316, if the balance of the account is less than the amount requested in Step 318, or the HCRP administrator 16, 17, 18 indicates that the claim is not sufficiently substantiated in Step 320, the verification module 300 provides a denial response message to the messaging module 200, which is shown as Step 313.

In a particular embodiment, the verification module 300 also compares each claim with previously received claims that are stored on the claims processing system to identify claims that may be duplicates of previously received claims, which is shown as Step 325. In particular, according to one embodiment, the verification module 300 may compare the amount requested, the date of purchase, the vendor, the type of goods or services being purchased, and/or the person making the purchase with similar information stored for previously processed claims. According to another embodiment, the verification module 300 may compare this type of information with claims that have been processed by the claims processing system but have not been paid as part of a settlement transaction between the HCP and the claims processing system or between the claims processing system and the HCRP administrator 16, 17, 18. In addition, the verification module 300 may compare the claim with claims stored over a particular time period (e.g., claims stored over the past 15 days). Step 325, according to a particular embodiment, occurs between Steps 302 and 304, and if the claim does not appear to be a duplicate of a previously received claim, the verification module 300 proceeds to Step 304. If the claim does appear to be a duplicate of a previously received claim, the claims processing system sends a response to the health care provider indicating that the claim is duplicate.

Settlement Module

FIG. 6 illustrates a flow diagram of a settlement module 400 according to an embodiment of the invention. Beginning at Step 402, the settlement module 400 generates a settlement request for each HCRP administrator 16, 17, 18 that includes a request for payment of the claims processed by the claims processing system 95 on behalf of the HCRP administrator 16, 17, 18 within a particular time period (e.g., daily, every three days, weekly, etc.). In one embodiment, the settlement request may include, for example, a customer identifier, a date of service, a health care provider identifier, a transaction, or claim reference number, and an amount requested to be paid by the health care reimbursement account. The settlement requests are then electronically transmitted to each HCRP administrator 16, 17, 18 via the second communications network 15b for processing by the HCRP administrators 16, 17, 18, which is shown in Step 404. The HCRP administrators 16, 17, 18 process the settlement requests and transmit payment for the claims in the settlement request to the claims processing system 95. The payment may be transmitted to the claims processing system 95 via any conventional method, including electronic funds transfer (EFT), automatic clearing house (ACH), or a check sent via a carrier (e.g., US Mail, delivery service, UPS, or FedEx). In addition, the HCRP administrators 16, 17, 18 may provide a detailed payment file (e.g., via FTP) with payment to the claims processing system 95.

The payments and the detailed payment files from the HCRP administrators 16, 17, 18 are received in Step 406, and in response to receiving each payment, the claims processing system 95 reconciles the payments and payment files with the transaction information stored by the claims processing system 95, which is shown as Step 407. Next, the settlement module 400 transmits payment (e.g., via ACH, EFT, or a check sent via a carrier (e.g., US Mail, delivery service, UPS, or FedEx)) and a standard 835 remittance file (e.g., via FTP) to each health care provider 11, 12, 13 due payment, which is shown in Step 408. The 835 remittance file is a standard form used in the health care industry to itemize the claims processed for the health care provider 11, 12, 13 and identify any claims submitted that may not have been processed by the claims processing system 95 and/or HCRP administrator 16, 17, 18 (e.g., due to a timed out network session with the claims processing system 95). However, it will be understood by one of ordinary skill in the art that any form or document that provides details regarding claims submitted by the health care provider 11, 12, 13 are within this scope of this disclosure. In addition, Step 407 may occur prior to Step 408, as shown, or it may occur after Step 408, according to various embodiments of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

The invention claimed is:

1. A claims processing system for processing health care reimbursement plan claims, said system comprising at least one processor configured to:

receive one or more rules from a health care reimbursement plan administrator indicating information required to substantiate the claims;

receive from a health care provider, via a communications network, a claim to pay at least a portion of a cost associated with a purchase for a health care-related service or product provided by said health care provider;

determine that said claim comprises a customer identifier associated with a customer, a health care reimbursement plan account identifier associated with a health care reimbursement plan account that covers monetary expenses uncovered by a primary insurance plan, a primary health care plan identifier associated with said primary insurance plan, or an amount requested to be paid associated with the cost;

determine whether the account is eligible and whether a balance of the account is greater than or equal to a portion of the amount, in response to determining that the portion of the amount is uncovered by the primary insurance plan;
   in response to determining that the account is eligible and that the balance is greater than or equal to the portion of the amount, automatically determine whether said claim is sufficiently substantiated, based on a comparison of the information in the claim and the rules, to verify whether the purchase qualifies as a valid purchase according to the account;
   in response to verifying that said claim is sufficiently substantiated, generate an approval response message for transmitting to said health care provider over said communications network, the approval response message comprises information indicating that the portion of the amount is approved; and
   in response to said claim not being sufficiently substantiated, generate a denial response message for transmitting to said health care provider over said communications network,
   wherein said communications network comprises one or more non-banking networks.

2. The system of claim 1 wherein said health care reimbursement plan administrator provides types of data required to substantiate claims to said claims processing system, and said step of verifying that said claim is sufficiently substantiated further comprises verifying said claim comprises at least said types of data.

3. The system of claim 1 wherein said communications network is a first communications network and said claims processing system is further configured to:
   generate a request for said health care reimbursement plan administrator to review said claim and to verify that said claim is sufficiently substantiated;
   transmit said request over a second communications network; and
   receive a response from said health care reimbursement plan administrator over said second communication network indicating whether said claim is sufficiently substantiated.

4. The system of claim 3 wherein said response from said health care reimbursement plan administrator comprises a first set of data indicating whether said claim is sufficiently substantiated and said claims processing system is configured for translating said first set of data into a second set of data for sending to said health care provider over said first communications network, said second set of data being readable by said health care provider.

5. The system of claim 3 wherein said first communications network and said second communications network are the same.

6. The system of claim 3 wherein said first communications network and said second communications network are separate.

7. The system of claim 1 wherein said approval response comprises an amount of coverage.

8. The system of claim 7 wherein said approval response comprises a balance of said health care reimbursement account.

9. The system of claim 1 wherein said communications network is a first communications network and said claim is received by said claims processing system in a first format from said health care provider, said claims processing system being further configured to translate said claim into a second format for sending to said health care reimbursement plan administrator over a second communications network, said second format being readable by said health care reimbursement plan administrator.

10. The system of claim 9 wherein said first format comprises an alpha/numeric code and said second format comprises text.

11. The system of claim 9 wherein said first format comprises a national drug code number associated with a prescribed drug and said second format comprises a name of said prescribed drug.

12. The system of claim 9 wherein said first format comprises a code identifying said health care provider and said second format comprises a name of said health care provider.

13. The system of claim 9 wherein said first format comprises a code identifying a health care-related service or product and said second format comprises a textual description of said health care-related service or product.

14. The system of claim 1 wherein said denial message comprises a code indicating said claim has been denied.

15. The system of claim 1 wherein said denial message comprises text indicating said claim has been denied.

16. The system of claim 1 wherein said denial message comprises at least a portion of said amount requested to be paid by said health care reimbursement plan account that has been denied.

17. The system of claim 1 wherein said claims processing system is remotely located from said health care provider.

18. The system of claim 1 wherein said claims processing system is further configured to:
   receive a list of eligible health care reimbursement plan account identifiers from each of one or more health care reimbursement plan administrators;
   compare said health care reimbursement plan account identifier to said list of eligible health care reimbursement plan accounts to verify said health care reimbursement plan account identifier is associated with an eligible health care reimbursement plan account; and
   in response to said health care reimbursement plan account identifier not being associated with an eligible health care reimbursement account, generate a denial response message for transmitting to said health care provider over said first communications network.

19. The system of claim 18 wherein said list of eligible health care reimbursement plan account identifiers further comprises an account balance associated with each health care reimbursement plan account identifier and said claims processing system is further configured to:
   compare said amount requested to said balance associated with said health care reimbursement plan account identifier to verify said balance of said health care reimbursement plan account is greater than or equal to said amount requested; and
   in response to said balance associated with said health care reimbursement plan account identifier being less than said amount requested, generate a denial response message for transmitting to said health care provider over said communications network.

20. The system of claim 1 wherein said claims processing system is further configured to:
   receive a list of eligible health care reimbursement plan account identifiers and their associated balances from each of one or more health care reimbursement plan administrators;
   compare said health care reimbursement plan account identifier to said list of eligible health care reimbursement plan accounts to verify said health care reimbursement plan account identifier is associated with an eligible health care reimbursement plan account;
compare said amount requested to said balance associated with said health care reimbursement plan account identifier to verify said balance of said health care reimbursement plan account is greater than or equal to said amount requested; and
in response to said health care reimbursement plan account identifier not being associated with an eligible health care reimbursement account or said balance associated with said health care reimbursement plan account identifier being less than said amount requested, generate a denial response message for transmitting to said health care provider over said communications network.

21. The system of claim 1 wherein said claims processing system is further configured to:
generate a settlement request for a health care reimbursement plan administrator associated with said health care reimbursement plan account, said settlement request comprising an amount to be paid for one or more claims processed by said claims processing system over a predetermined time period on behalf of said health care reimbursement plan;
receive from said health care reimbursement plan administrator payment for said settlement request;
reconcile said payment for said settlement request with said one or more claims processed by said claims processing system; and
transmit payment to each of one or more health care providers that submitted claims to said claims processing system over said predetermined time period.

22. The system of claim 21 wherein said claims processing system is further configured to generate a report for each of said one or more health care providers identifying claims processed by said claims processing system during said predetermined time period.

23. A method for processing health care reimbursement plan claims, said method comprising:
receiving one or more rules from a health care reimbursement plan administrator indicating information required to substantiate the claims;
receiving from a health care provider, via a communications network, a claim to pay at least a portion of a cost associated with a purchase for a health care-related service or product provided by said health care provider;
determining that said claim comprises a customer identifier associated with a customer, a health care reimbursement plan account identifier associated with a health care reimbursement plan account that covers monetary expenses uncovered by a primary insurance plan, a primary health care plan identifier associated with said primary insurance plan, or an amount requested to be paid associated with the cost;
determining whether the account is eligible and whether a balance of the account is greater than or equal to a portion of the amount, in response to determining that the portion of the amount is uncovered by the primary insurance plan;
in response to determining that the account is eligible and that the balance is greater than or equal to the portion of the amount, automatically determine, via a processor, whether said claim is sufficiently substantiated, based on a comparison of the information in the claim and the rules, to verify whether the purchase qualifies as a valid purchase according to the account;
in response to verifying that said claim is sufficiently substantiated, generating an approval response message for transmitting to said health care provider over said communications network, the approval response message comprises information indicating that the portion of the amount is approved; and
in response to said claim not being sufficiently substantiated, generating a denial response message for transmitting to said health care provider over said communications network,
wherein said communications network comprises one or more non-banking networks.

24. The method of claim 23 wherein said step of verifying that said claim is sufficiently substantiated comprises verifying said claim comprises one or more types of data required by said health care reimbursement plan administrator to substantiate claims.

25. The method of claim 23 wherein said step of verifying that said claim is sufficiently substantiated comprises verifying said claim comprises one or more types of data required by law to substantiate claims.

26. The method of claim 23 wherein said step of verifying that said claim is sufficiently substantiated is performed remotely from said health care provider.

27. The method of claim 23 wherein said step of verifying that said claim is sufficiently substantiated comprises the steps of:
generating an electronic request for said health care reimbursement plan administrator to review said claim and verify that said claim is sufficiently substantiated;
transmitting said request to said health care reimbursement plan administrator; and
receiving a response from said health care reimbursement plan administrator indicating whether said claim is sufficiently substantiated.

28. The method of claim 27 wherein said communications network is a first communications network and said request is transmitted and said response is received via a second communications network.

29. The method of claim 23 wherein said response from said health care reimbursement plan administrator verifying that said claim is sufficiently substantiated comprises a first set of data and said step of generating an approval message for transmitting to said health care provider further comprises translating said first set of data into a second set of data for sending to said health care provider, said second set of data being readable by said health care provider.

30. The method of claim 23 further comprising:
generating a settlement request for each of said one or more health care reimbursement plan administrators for which said system has received approved claims over a particular time period;
transmitting said settlement request to each of said one or more health care reimbursement plan administrators;
receiving payment from each of said one or more health care reimbursement plan administrators; and
transmitting payment for each approved claim to said health care provider providing said service or product subject to each of said claim.

31. The method of claim 23 wherein said approval response comprises an amount of coverage.

32. The method of claim 31 wherein said approval response comprises a balance of said health care reimbursement plan account.

33. A computer program product for processing claims for a health care reimbursement plan account, wherein said computer program product comprises at least one computer-readable storage medium having computer-readable program code portions stored therein, said computer-readable program code portions comprising:

a first executable portion for receiving one or more rules from a health care reimbursement plan administrator indicating information required to substantiate the claims;

a second executable portion for receiving from a health care provider, via a communications network, a claim to pay at least a portion of a cost associated with a purchase for a health care-related service or product provided by said health care provider;

a third executable portion for determining that said claim comprises a customer identifier associated with a customer, a health care reimbursement plan account identifier associated with a health care reimbursement plan account that covers monetary expenses uncovered by a primary insurance plan, a primary health care plan identifier associated with said primary insurance plan, or an amount requested to be paid associated with the cost;

a fourth executable portion for determining whether the account is eligible and whether a balance of the account is greater than or equal to a portion of the amount, in response to determining that the portion of the amount is uncovered by the primary insurance plan;

a fifth executable portion for automatically determining whether said claim is sufficiently substantiated, based on a comparison of the information in the claim and the rules, to verify whether the purchase qualifies as a valid purchase according to the account, in response to determining whether the account is eligible and whether a balance of the account is greater than or equal to the portion of the amount;

a sixth executable portion for generating an approval response message for transmitting to said health care provider over said communications network in response to verifying that said claim is sufficiently substantiated, the approval response message comprises information indicating that the portion of the amount is approved; and an eighth executable portion for generating a denial response message for transmitting to said health care provider over said communications network in response to said claim not being sufficiently substantiated, wherein said communications network comprises one or more non-banking networks.

34. A network entity configured to process claims for a health care reimbursement plan account, said network entity comprising:

a processor; and a memory in communication with the processor, said memory storing an application executable by the processor, wherein the application is configured, upon execution, to:

receive one or more rules from a health care reimbursement plan administrator indicating information required to substantiate the claims;

receive, via a communications network from a health care provider, a claim to pay at least a portion of a cost associated with a purchase for a health care-related service or product provided by said health care provider;

determine that said claim comprises a customer identifier associated with a customer, a health care reimbursement plan account identifier associated with a health care reimbursement plan account that covers monetary expenses uncovered by a primary insurance plan, a primary health care plan identifier associated with said primary insurance plan, or an amount requested to be paid associated with the cost;

determine whether the account is eligible and whether a balance of the account is greater than or equal to a portion of the amount, in response to determining that the portion of the amount is uncovered by the primary insurance plan;

in response to determining that the account is eligible and that the balance is greater than or equal to the portion of the amount, automatically determine whether said claim is sufficiently substantiated, based on a comparison of the information in the claim and the rules, to verify whether the purchase qualifies as a valid purchase according to the account;

generate an approval response message for transmitting to said health care provider over said communications network in response to verifying that said claim is sufficiently substantiated, the approval response message comprises information indicating that the portion of the amount is approved; and generate a denial response message for transmitting to said health care provider over said communications network in response to said claim not being sufficiently substantiated, wherein said communications network comprises one or more non-banking networks.

35. The system of claim 1, wherein the at least one processor is further configured to determine whether the account is eligible by comparing the health care reimbursement plan account identifier with the customer identifier.

36. The network entity of claim 34, wherein the application is further configured, upon execution to determine whether the account is eligible by comparing the health care reimbursement plan account identifier with the customer identifier.

* * * * *